United States Patent
Aylward et al.

(10) Patent No.: US 6,521,329 B2
(45) Date of Patent: Feb. 18, 2003

(54) RADIOGRAPHIC PHOSPHOR PANEL HAVING REFLECTIVE POLYMERIC SUPPORTS

(75) Inventors: Peter T. Aylward, Hilton, NY (US); David J. Steklenski, Rochester, NY (US); James F. Elman, Fairport, NY (US)

(73) Assignee: Eastman Kodak Company, Rochester, NY (US)

(*) Notice: Subject to any disclaimer, the term of this patent is extended or adjusted under 35 U.S.C. 154(b) by 0 days.

(21) Appl. No.: 09/883,801

(22) Filed: Jun. 18, 2001

(65) Prior Publication Data

US 2003/0003312 A1 Jan. 2, 2003

(51) Int. Cl.[7] .................. B32B 27/06; B32B 27/30; B32B 27/32; B32B 27/36; B32B 27/40
(52) U.S. Cl. .................. 428/212; 428/213; 428/421; 428/402; 428/480; 428/483; 428/522; 428/523; 427/402; 427/407.1; 427/412.1; 427/412.3; 427/412.5; 252/301.4 R; 252/301.4 H; 252/301.4 S; 250/484.2; 250/484.4; 250/487.1
(58) Field of Search .................. 428/212, 213, 428/402, 403, 421, 480, 483, 522, 523; 427/402, 407.1, 412.1, 412.3, 412.5; 252/301.4 R, 301.4 H, 301.4 S; 250/484.2, 484.4, 487.1; 430/496, 499

(56) References Cited

U.S. PATENT DOCUMENTS

| | | | | |
|---|---|---|---|---|
| 4,733,089 A | * | 3/1988 | Kitada et al. | 250/483.1 |
| 4,865,944 A | * | 9/1989 | Roberts et al. | 250/483.1 |
| 4,912,333 A | * | 3/1990 | Roberts et al. | 250/483.1 |
| 5,401,971 A | * | 3/1995 | Roberts | 250/483.1 |
| 5,507,976 A | * | 4/1996 | Bringley et al. | 250/484.2 |
| 5,607,774 A | * | 3/1997 | Dahlquist et al. | 250/483.1 |
| 5,698,857 A | * | 12/1997 | Lambert et al. | 250/483.1 |
| 5,795,708 A | | 8/1998 | Boutet | |
| 5,825,543 A | | 10/1998 | Ouderkirk et al. | |
| 5,830,629 A | * | 11/1998 | Vizard et al. | 430/523 |
| 5,867,316 A | | 2/1999 | Carlson et al. | |
| 5,882,774 A | | 3/1999 | Jonza et al. | |
| 5,888,647 A | * | 3/1999 | Yamane | 250/483.1 |
| 6,027,810 A | | 2/2000 | Dahlquist et al. | |
| 6,088,163 A | | 7/2000 | Gilbert et al. | |
| 6,111,696 A | | 8/2000 | Allen et al. | |
| 6,346,707 B1 | * | 2/2002 | Vizard et al. | 250/368 |

* cited by examiner

Primary Examiner—Vivian Chen
(74) Attorney, Agent, or Firm—J. Lanny Tucker

(57) ABSTRACT

A radiographic phosphor panel includes a phosphor layer that transmits actinic radiation in a range that is reflected by a transparent, polymeric multi-layer reflector used as a support. The polymeric multi-layer reflector has numerous alternating layers of at least two different polymeric materials and reflects at least 50% of actinic radiation in the range of wavelengths to which the phosphor is sensitive. The use of this polymeric multi-layer reflector in the radiographic phosphor panel provides increased photographic speed when it is used in imaging assemblies with photosensitive recording materials such as radiographic silver halide films.

31 Claims, 6 Drawing Sheets

RADIOGRAPHIC PHOSPHOR PANEL HAVING REFLECTIVE POLYMERIC SUPPORTS

FIELD OF THE INVENTION

This invention relates to new and improved fluorescent intensifying screens (or radiographic phosphor panels) used in imaging from X-radiation. In particular, it relates to such screens having reflective polymeric supports that provide increased photographic speed and image sharpness.

BACKGROUND OF THE INVENTION

In silver halide photography one or more radiation sensitive emulsion layers are coated on a support and imagewise exposed to electromagnetic radiation to produce a latent image in the silver halide emulsion layer(s). The latent image is converted to a viewable image upon subsequent chemical photoprocessing.

Roentgen discovered X-radiation by the inadvertent exposure of a silver halide photographic element to X-rays. In 1913 the Eastman Kodak Company introduced its first silver halide photographic element specifically intended to be exposed by X-radiation (that is, its first silver halide radiographic element).

The medical diagnostic value of radiographic imaging is widely accepted. Nevertheless, the desirability of limiting patient exposure to X-radiation has been appreciated from the inception of medical radiography. Silver halide radiographic elements are more responsive to longer wavelength electromagnetic radiation than to X-radiation.

Low X-radiation absorption by silver halide radiographic elements as compared to absorption of longer wavelength electromagnetic radiation led quickly to the use of fluorescent intensifying screens (hereinafter, radiographic phosphor panels) when the Patterson Screen Company in 1918 introduced matched intensifying screens for Kodak's first dual coated radiographic element.

A radiographic phosphor panel contains on a support a fluorescent phosphor layer that absorbs X-radiation more efficiently than silver halide and emits to longer wavelength radiation to an adjacent radiographic element in an imagewise pattern corresponding to that of the X-radiation received.

The need to increase the diagnostic capabilities of radiographic imaging while minimizing patient exposure to X-radiation has presented a significant, long-standing challenge in the construction of both radiographic elements and intensifying screens. In constructing radiographic phosphor panels, the desire to achieve the maximum longer wavelength electromagnetic radiation emission possible for a given level of X-radiation exposure (which is realized as maximum imaging speed) while obtaining the highest achievable level of image definition (that is, sharpness or acuity). Since maximum speed and maximum sharpness in radiographic phosphor panel construction are not compatible features, most commercial panels represent the best attainable compromise for their intended use.

The choice of a support for a radiographic phosphor panel illustrates the mutually exclusive choices that are considered in screen optimization. It is generally recognized that supports having a high level of absorption of emitted longer wavelength electromagnetic radiation produce the sharpest radiographic images. Radiographic phosphor panels that produce the sharpest images are commonly constructed with black supports or supports loaded with carbon particles. Often transparent screen supports are employed with the panel being mounted in a cassette for exposure along with a black backing layer. In these constructions, sharpness is improved at the expense of photographic speed because a portion of the otherwise available, emitted longer wavelength radiation is not directed to the adjacent radiographic element.

If a black or transparent radiographic phosphor panel support is replaced by a more reflective support, a substantial increase in speed can be realized. The most common conventional approach is to load or coat a screen support with a white pigment, such as titania or barium sulfate. U.S. Pat. No. 3,787,238 (Juliano), U.S. Pat. No. 4,318,001 (Degenhardt), and U.S. Pat. No. 4,501,971 (Ochiai) are illustrative of the use of such supports.

Thus, conventional supports for radiographic phosphor panels include cardboard, plastic films such as those of cellulose acetate, polystyrene, and poly(methyl methacrylate). Particularly preferred are films of poly (ethylene terephthalate). The plastic supporting films may contain light absorbing materials such as dyes or pigments such as carbon black, or may contain light reflecting materials such as titanium dioxide or barium sulfate.

However, even the best reflective supports known in the art have degraded image sharpness in relation to imaging speed so as to restrict their use to situations wherein image definition (or sharpness) is less demanding. Further, many types of reflective supports that have been found suitable for other purposes have been tried and rejected for use in fluorescent intensifying screens. For example, the loading of the supports with optical brighteners, widely employed as "whiteners", has been found to be incompatible with achieving satisfactory image sharpness.

By a process of trial and error over a development period of approximately 70 years the radiographic phosphor panel art has developed a preference for reflective supports from a relatively limited class of constructions. In addition, workers in the art have generally not chosen supports that, though nominally reflective, were developed for other, less demanding purposes.

During the last 25 years as the potentially deleterious effects of even low levels of X-radiation exposure have been publicly called into question, every obvious improvement and continual innovation have increased the capabilities of diagnostic radiographic imaging while reducing patient X-ray exposure.

There has exists in the art a class of reflective supports hereinafter referred to as "stretch cavitation microvoided" supports. For example, U.S. Pat. No. 3,154,461 (Johnson) discloses a polymeric film loaded with microbeads of calcium carbonate of from 1 to 5 $\mu$m in size. By biaxially stretching the support, stretch cavitation microvoids were introduced, rendering the support opaque.

Primary interest in stretch cavitation microvoided supports has centered on imparting to polymer film supports paper-like qualities, as illustrated in U.S. Pat. No. 4,318,950 (Takaski et al.), U.S. Pat. No. 4,340,639 (Toyoda et al.), U.S. Pat. No. 4,377,616 (Ashcraft et al.), U.S. Pat. No. 4,438,175 (Ashcraft et al.), and H. H. Morris et al., "White Opaque Plastic Film and Fiber for Papermaking Use," *ACS Div. Org. Coatings Plastic Chemistry*, Vol. 34, pp.75–80, 1974.

More recently, stretch cavitation microvoided supports have been considered as possible replacements for photographic print supports, as illustrated in U.S. Pat. No. 3,944,699 (Matthew et al.), U.S. Pat. No. 4,187,113 (Matthews et al.) and U.K. Patent Specifications 1,593,591 and 1,593,592 (both Remmington et al.). Polypropylene microbeads are in one instance employed, but the preferred microbeads are white pigment barium sulfate microbeads. U.S. Pat. No. 4,912,333 (Roberts et al.) proposes the use of reflective lenslets.

Other stretch cavitation microvoided shaped articles, such as films, sheets, bottles, tubes, fibers, and rods, are also known wherein the polymer forming the continuous phase is a polyester and the microbeads are a composed of a cellulose ester.

None of the art has suggestion that stretch cavitation microvoided supports might be suitable for the demanding properties needed in radiographic phosphor panels.

U.S. Pat. No. 6,027,810 (Dahlquist et al.) discloses improved radiographic phosphor panel performance with the use of an antistatic material in a top protective layer or in the phosphor layer.

U.S. Pat. No. 5,475,229 (Itabashi et al.) discloses a novel radiographic phosphor panel that has improved durability with the uses of thermoplastic binder and in particular a fluoro-resin coated over the phosphor layer.

The use of reflective bases to enhance screen speed is well known in the art, and many current screens (KODAK LANEX Regular) for example are coated on titanium dioxide or other white bases to provide a speed advantage. Typically, reflection is obtained from the volume of the support. That is, the reflectance is not only from the surface of the support, but extends some distance into the support. These layers provide increased speed in proportion to their reflectance, but with each increment in speed gained, there is a loss in sharpness due to the diffuse nature of the reflectance, both in the screen and in the reflecting support.

Specular reflectors such as those formed from evaporated metal films (aluminum, nickel etc.) can also be used as panel supports. The common specular reflectors have disadvantages however in that they generally have lower maximum reflectance than the diffuse reflectors at the wavelengths of light emitted by the common phosphor materials. Moreover, the evaporated metal layers are relatively fragile, and if a phosphor layer is coated directly onto the reflective metal layer, substantial reflectance is lost. A polymeric film can be applied to the metal reflector to protect it from the coating solvents, but the presence of this film separates the reflector from the phosphor layer and can cause flare light that is damaging to the resulting image.

U.S. Pat. No. 5,795,708 (Boutet) describes the use of a dichroic mirror antihalation layer to increase speed and improve sharpness for heat processable films. The continuous dichroic mirror layer is formed from multiple alternating layers of silicon dioxide and titanium dioxide and is coated on top of a base layer (that is a support).

Multilayer polymeric stacks have also been disclosed that function as wavelength selective reflectors such as "cold mirrors" that reflect visible light but transmit infrared or "hot mirrors" that transmit visible and reflect infrared. Examples of a wide variety of multilayer stacks are included in U.S. Pat. No. 5,882,774 (Jonza et al.).

Problem to be Solved

There is a need in the art for radiographic phosphor panels that have increased photographic speed without a loss in image sharpness. There is a need for such panels to be designed using a specular reflector with high reflectance and robustness to coating solvents. There is also a need to obtain such high reflectance to maximize speed gain (reduced patient dose) while the specular nature of the reflector and its location directly under the phosphor layer would minimize sharpness losses. The resulting improvement in the speed and sharpness of the panel would provide broader latitude in the design of pairs of panels for improved diagnostic capability.

SUMMARY OF THE INVENTION

The present invention provides a radiographic phosphor panel comprising a polymeric multi-layer reflector.

More particularly, the radiographic phosphor panel of this invention comprises a phosphor layer that is disposed on the polymeric multi-layer reflector and is comprised of fluorescent phosphor particles dispersed in a film forming binder, and further comprises a protective overcoat.

Still further, this invention provides a radiographic imaging assembly comprising at least one radiographic phosphor panel comprising a polymeric multi-layer reflector, wherein the at least one radiographic phosphor panel is arranged in association with a photosensitive recording material, such as a silver halide radiographic film.

In addition, this invention provides a method of producing a radiographic phosphor panel comprising a supported layer of phosphor particles dispersed in a binder and a protective overcoat thereover wherein the binder consists essentially of one or more elastomeric polymers, and wherein the panel is prepared by dispersing phosphor particles in a binder consisting essentially of the one or more elastomeric polymers, coating the dispersed phosphor particles on a polymeric multi-layer reflector in a manner so as to form a phosphor layer without compressing the resulting dried phosphor layer, and coating a protective coating thereover.

The present invention provides a number of advantages. It provides a radiographic phosphor panel (or fluorescent intensifying screen) that provides increased photographic speed in imaged photosensitive recording materials without a loss in image sharpness.

These and other advantages of the invention are accomplished by the use of a polymeric multi-layer reflector (generally as the support) in the radiographic phosphor panel. More details about such polymeric multi-layer reflectors are provided in the text below as well as the accompanying drawings.

Thus, the purpose of the polymeric multi-layer reflector described herein is to provide enhanced speed to the exposed photosensitive recording material without the need for changing that material in chemical composition or structure. Conversely, the invention can allow for reducing the amount of photosensitive recording material while maintaining a given speed. The speed of the material is directly related to the amount of light absorbed in its photosensitive layer(s). Since many photosensitive layers only absorb a small fraction of the incident light, a support that returns the incident light for a second pass through the photosensitive layer(s) will effectively double the amount of light absorbed.

DETAILED DESCRIPTION OF THE INVENTION

For the purposes of this invention, the term "photosensitive recording material" refers to a light sensitive material (generally radiographic silver halide films) used in radiography (both for medical, veterinary, and industrial purposes).

The terms "X-radiation intensifying screen," "fluorescent intensifying screen," and "radiographic phosphor panel" refer to the same material.

As herein employed the terms "longer wavelength electromagnetic radiation" and "emitted radiation", except as otherwise indicated, refer to electromagnetic radiation in the 300 to 1500 nm spectral range, including both the near ultraviolet and blue regions of the spectrum to which silver halide possesses native sensitivity and the visible and near infrared portions of the spectrum to which silver halide is readily spectrally sensitized.

In a preferred embodiment, the present invention relates to a radiographic phosphor panel having a polymeric multi-layer reflector as a support and having disposed directly thereon a phosphor layer containing one or more phosphors that emit light under X-radiation excitation. This radiographic phosphor panel is generally used in conjunction with a photosensitive recording material for the purpose of improving the sensitivity of that material in radiographic imaging.

The phosphors used in such panels are required to have good X-radiation absorption, a high X-radiation to light conversion efficiency, and low afterglow "noise". A radiographic phosphor panel comprising a phosphor having good X-radiation absorption has higher definition of X-radiation image and therefore can improve the diagnosis efficiency in the medical radiography. A phosphor having a high X-radiation to light conversion efficiency can be used with reduced X-radiation exposure to the patient. Further, a phosphor having a low quantity of afterglow component can prevent errors in diagnosis caused by incorrect density (afterglow noise).

A phosphor may emit light in the range from the blue to the green region of the electromagnetic spectrum, and is used in combination with an orthochromatic film that is sensitive in the same range.

An important advantage of the present invention is achieving enhanced visible light reflection in conjunction with the normal phosphor emission. Furthermore the polymeric multi-layer reflector used in this invention is composed of organic polymeric materials that have substantially no X-radiation absorption while providing additional visible light reflection that maximizes exposure of the orthochromatic film.

Figure 1A:
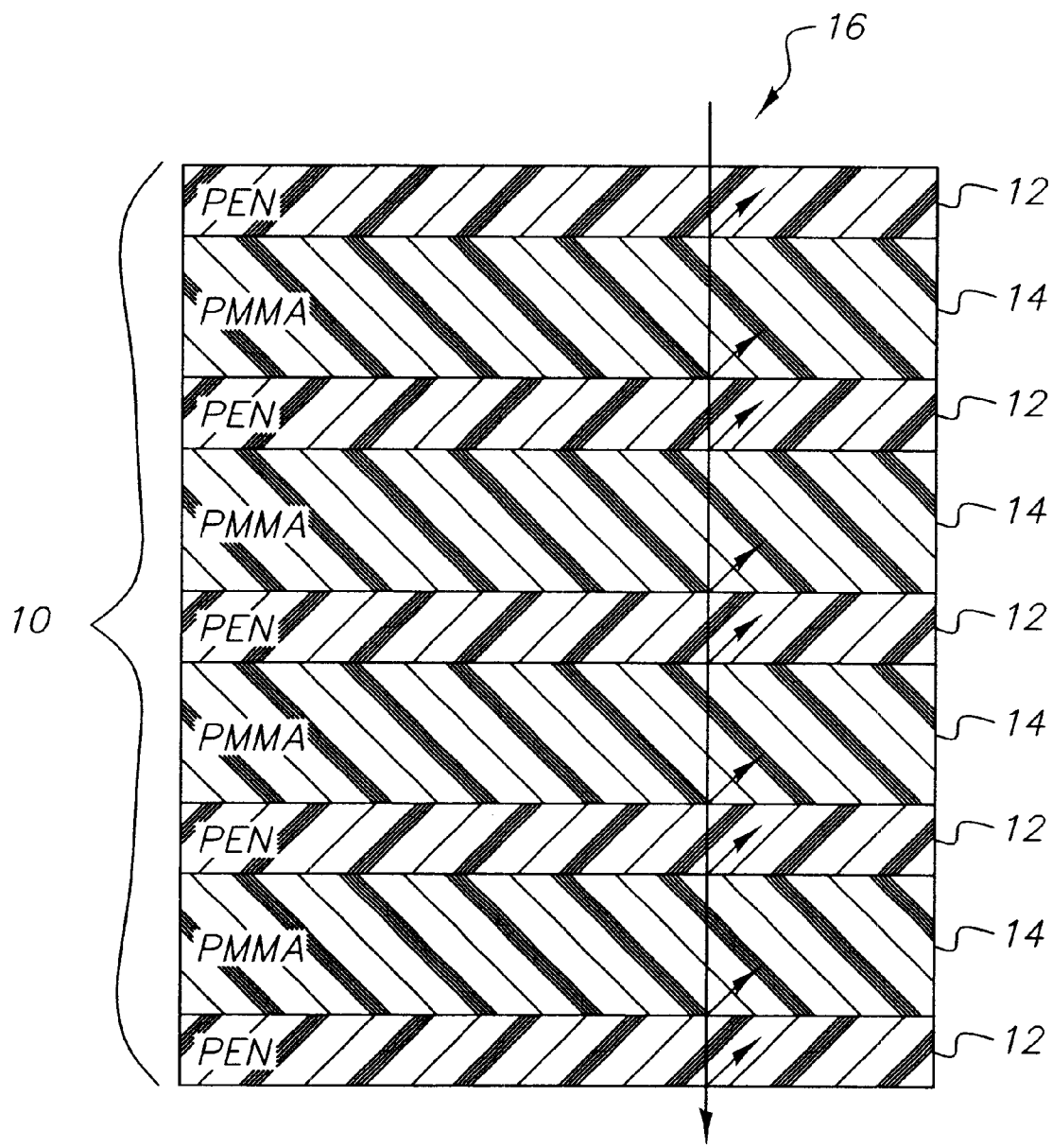
FIG. 1a is an enlarged cross-sectional view of a representative polymeric multi-layer reflector useful in the practice of this invention that comprises polymeric optical layers having alternating refractive indexes.

FIG. 1a shows a representative polymeric multi-layer reflector 10 comprising alternating poly(ethylene naphthalate) (PEN) optical layer 12 composed of a high refractive index polymer and poly(methyl methacrylate) (PMMA) optical layer 14 that is composed of a low refractive index polymer. Such a polymeric multi-layer reflector has at least a number (preferably at least 30 and more preferably from 300 to 1000) of repeating optical layers of alternating high and low refractive index. Such reflectors are often referred to as "dielectric mirrors" or "dielectric stacks." Visible radiation identified by arrow 16 is reflected at each interface with a change in refractive index.

Figure 1B:
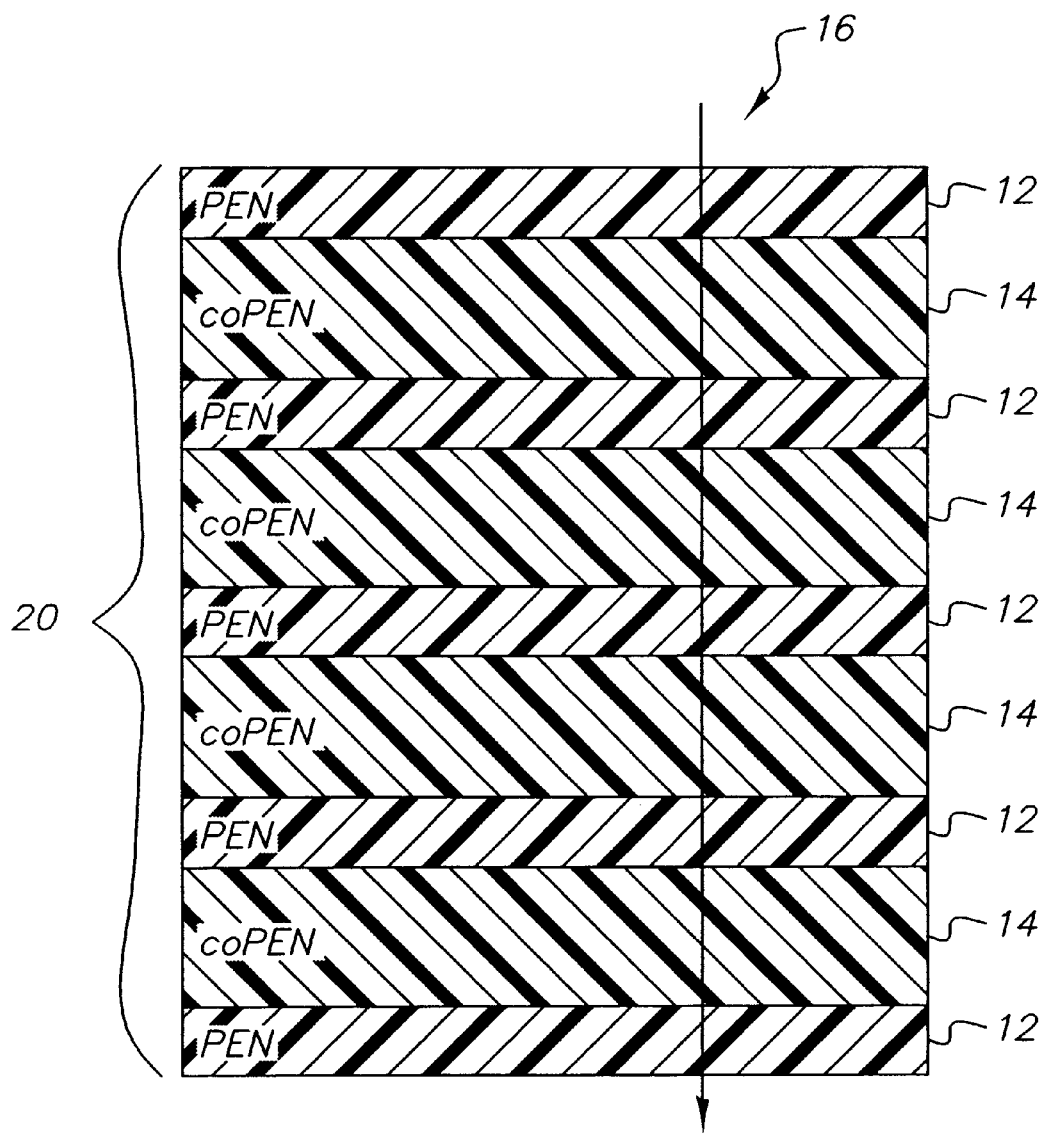
FIG. 1b is an enlarged cross-sectional view of another representative polymeric multi-layer reflector useful in the practice of this invention that comprises polymeric optical layers having common refractive indexes.

FIG. 1b similarly shows polymeric multi-layer reflector 20 comprising alternating PEN optical layers 12 and poly(ethylene naphthalate-co-terephthalate (90:10 carboxylate subunits) coPEN optical layers 14 wherein both optical layers have similar refractive indices but are different in thickness. Visible radiation identified by arrow 16 is reflected at each interface with a change in thickness.

Such a polymeric multi-layer reflector has numerous advantages over known highly diffuse reflectors that contain a pigment such as titanium dioxide or barium sulfate. While such known reflectors are somewhat efficient, they also absorb part of the exposing X-radiation. The disadvantage of such reflectors is that more exposing energy or longer exposure times are required to obtain the desired image. Insufficient exposure results in lower image quality that may result in missing some critical information while extended or higher level exposure to X-rays may result in inducing undesirable effects on the exposed patient. The polymeric multi-layer reflectors used in this invention do not have these problems because they absorb very little X-radiation. A radiographic phosphor panel may comprise a polymeric multi-layer reflector to provide such an effect, while still acting as a transparent support, if the exposing radiation is outside of the visible range or consists only of a narrow band of visible wavelengths. Such a radiographic phosphor panel preferably has a polymeric multi-layer reflector adhered to it in a suitable manner. Such embodiments allow a variety of materials with different surface compositions to be held in contact with each other.

In another preferred embodiment of this invention, the polymeric multi-layer reflector is located adjacent to the radiographic phosphor panel to allow maximum light reflection to the photosensitive recording materials being exposed.

In another aspect of the present invention, the polymeric multi-layer reflector is located adjacent the photosensitive layer(s) of the photosensitive recording material. Thus, the polymeric multi-layer reflector may be located on the topside of the radiographic phosphor panel. Alternatively, the polymeric multi-layer reflector may be adhered to a transparent supporting substrate that provides desired stiffness for assembly into the radiographic phosphor panel. In still another alternative, the polymeric multi-layer reflector may itself serve as the supporting substrate. In such a case the polymeric multi-layer reflector is an integral part of the radiographic phosphor panel. This last embodiment is most preferred because it avoids the expense and problems associated with adhering the reflector (for example, using an adhesive).

The polymeric multi-layer reflector can have a thickness of up to 125 μm, depending on the refractive indices of the polymeric materials of which it is composed. Preferably, the reflector thickness is from about 25 to about 80 μm. The various optical layers within the reflector can have the same or different thickness depending upon the polymeric materials used and the desired refractive indices.

As noted above, the polymeric multi-layer reflectors may further comprise a transparent supporting substrate that generally has a bending stiffness of 3 to 100 MN (as determined by the LORENTZEN & WETTRE STIFFNESS TESTER, MODEL 16D. The output from this instrument is the force, in millinewtons, required to bend the cantilevered, unclamped end of a sample 20 mm long and 38.1 mm wide at an angle of 15 degrees from the unloaded position). Useful support substrates can be composed of polyesters, polyolefins, polycarbonates, and polyamides, including their copolymer derivatives, as well as oriented film bases. During co-extrusion of multiple polymer layers to make the reflectors, a protective boundary layer can be located on the outside surfaces of the reflector in order to prevent turbulent flow of the layers due to shearing action near the walls of the extrusion equipment (such as a die). A thick protective boundary layer of poly(ethylene naphthalate) or poly(ethylene terephthalate) may advantageously serve dual purposes as a protective boundary layer and an optical layer used in the reflector. In order to prevent curl or warping of the support substrate with temperature or humidity, it may be preferable to utilize a symmetrical construction wherein the opposing protective boundary layers are approximately equal in composition and thickness. Alternatively, for some applications, the opposing protective boundary layers may have unequal thickness. If semi-crystalline polymers are utilized for both the optical layers and the protective boundary layers, they must be chosen such that the common orientation conditions will impart the needed optical and physical properties to each. The simplest case is to use the same polymer, such as, for example, PET for both the protective boundary layers and the high index optical layers. Alternatively, PEN may be used for both types of layers.

In another aspect of the practice of this invention, the radiographic phosphor panel can designed in such a manner that scattered radiation that causes halation in the material may be reflected by using optical layers tuned to reflect radiation at appropriate angles that are placed closer to the photosensitive layer(s) of the photosensitive recording material. Thus the need for an antihalation layer in the photosensitive recording material can be substantially reduced or even eliminated in some cases. To prevent the long distance lateral travel of the radiation that is scattered at the highest angles, it would be advantageous to place the thickest optical layers of the polymeric multi-layer reflector closest to the photosensitive layer(s) of the material. Radiation scattered at very high angles will be attenuated by absorption within the photosensitive layer(s) of the material.

Polymer Multi-layer Reflector

Although generally any polymeric multi-layer reflector can be used in the practice of this invention, a preferred reflector is one that specularly reflects incident activating radiation at a selected angle of incidence or over a wide range of angles. As used herein, "polymeric multi-layer reflectors" include multi-layer optical films having alternating polymeric optical layers having differing indices of refraction, as well as cholesteric film layers such as multiple pitch cholesteric layers. Both types of reflectors have a periodic variation in index of refraction in the thickness direction orthogonal to the plane of the film.

In a preferred embodiment of this invention, the polymeric multi-layer reflectors are substantially free of inorganic material. Reflectors that do not have inorganic materials will have less absorption and light scattering and will reflect more light to the photosensitive recording materials and therefore improving the efficiency of those materials.

In a one embodiment of this invention, polymeric multi-layer reflector has a spectral reflectance of from about 40 to 100% in a bandwidth wavelength greater than 10 nm (nanometers). In an additional embodiment, the reflector has a spectral reflectance from about 60 to 100% in a bandwidth wavelength greater than 10 nm. In a preferred embodiment, the reflector has a spectral reflectance greater than 90% in a bandwidth wavelength greater than 10 nm. Such preferred reflectors are useful for providing the optimum light reflection for the peak spectral sensitivity of photosensitive recording materials.

In a most preferred embodiment of this invention, the polymeric multi-layer reflector has a spectral reflectance greater than 90% in the bandwidth wavelength from about 350 to 750 nm. Such reflectors provide somewhat uniform light reflection across the visible wavelength as well as the near ultraviolet and infrared regions. This helps to assure maximum exposure to a photosensitive recording material.

The polymeric multi-layer reflector used in this invention can have alternating layers of polymers (at least two polymers) that have different refractive indices, and in a preferred embodiment, the two different polymers alternate adjacent positions. Such reflectors are preferred because they provide added light reflection at each interface. Another suitable embodiment of this invention comprises two or more different polymer layers having at least a 0.1 unit refractive index difference between adjacent polymer layers. Preferably, these alternating polymer layers are isotropic.

The polymeric multi-layer reflector of the present invention is also preferably a dielectric optical film having alternating layers of a first polymer having a high index of refraction and a second polymer having a low index of refraction which layers interact to reflect at least 50% of the incident light from the phosphor screen at a selected incidence angle. The in-plane indices of refraction of the first and second polymers should differ by at least 0.03 (preferably by at least 0.4). Suitable isotropic polymeric multi-layer reflectors that are designed to reflect in the infrared region of the spectrum are described, for example, in U.S. Pat. RE 34,605 (Shrenk et al.), U.S. Pat. No. 5,233,465 (Wheatley et al.), and U.S. Pat. No. 5,360,659 (Arends et al.), all of which are herein incorporated by reference. To maintain maximum visible transmission, layer design techniques can be used which reduce higher order overtones that reflect in the visible region of the spectrum. For example, U.S. Pat. RE 34,605 (noted above) describes an all polymeric three-component optical interference film formed by co-extrusion techniques that reflects infrared light while suppressing second, third and fourth order reflections in the visible region of the spectrum. U.S. Pat. No. 5,360,659 (noted above) describes an all-polymeric two-component film which can also be co-extruded and reflects infrared light while suppressing second, third, and fourth order wavelengths that occur in the visible portion of the spectrum. The film comprises alternating layers of first (A) and second (B) diverse polymeric materials having a six layer alternating repeating unit with relative optical thickness of about 7:1:1. At least 6 of these repeating units are desirable.

Preferably, the optical layers of the polymeric multi-layer reflectors have a 0.25 wavelength thickness with different sets of optical layers designed to reflect different wavelength ranges. Each optical layer does not have to be exactly 0.25 wavelength thick. The overriding requirement is that the adjacent low-high index optical layer pair has a total optical thickness of 0.5 wavelength. The bandwidth of a 50-layer stack of PEN/coPEN layers (like FIG. 1b) or PEN/PMMA layers (like FIG. 1a) having the index differential greater than 0.2, with layer thickness chosen to be a 0.25 wavelength of 550 nm, is about 50 nm. This 50-layer stack provides roughly a 99% average reflectivity in this wavelength range with no measurable absorption.

Figure 2:
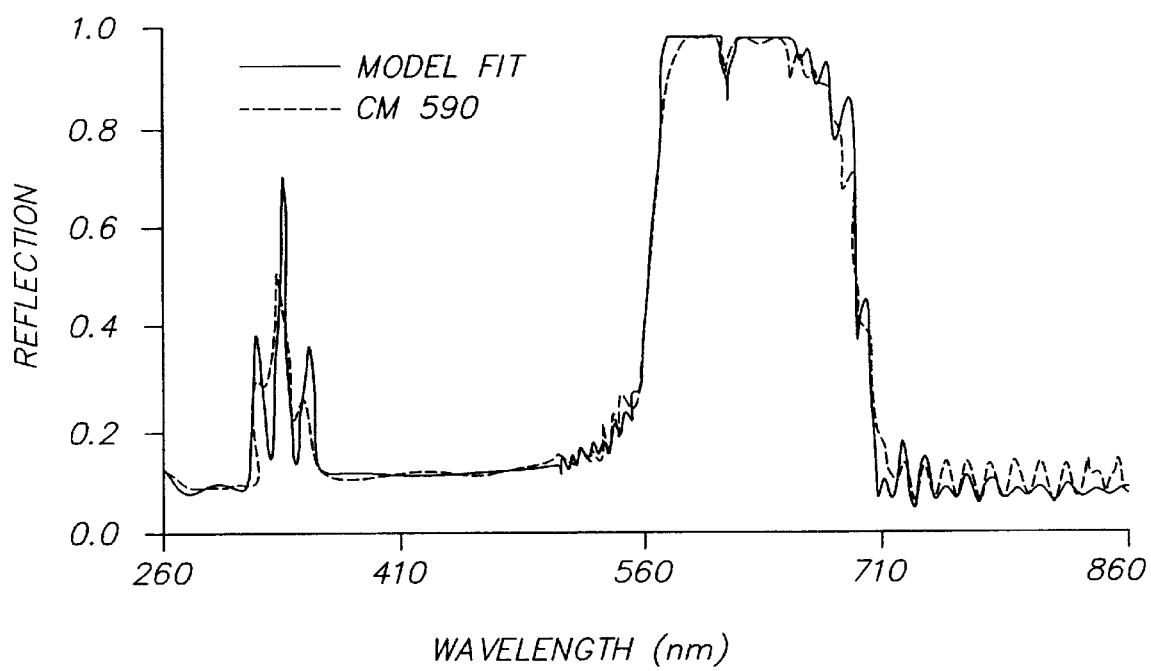
FIG. 2 is a typical spectral reflectance (reflection vs. wavelength) of a commercially available CM 590 mirror (3M Corporation).
Figure 3:
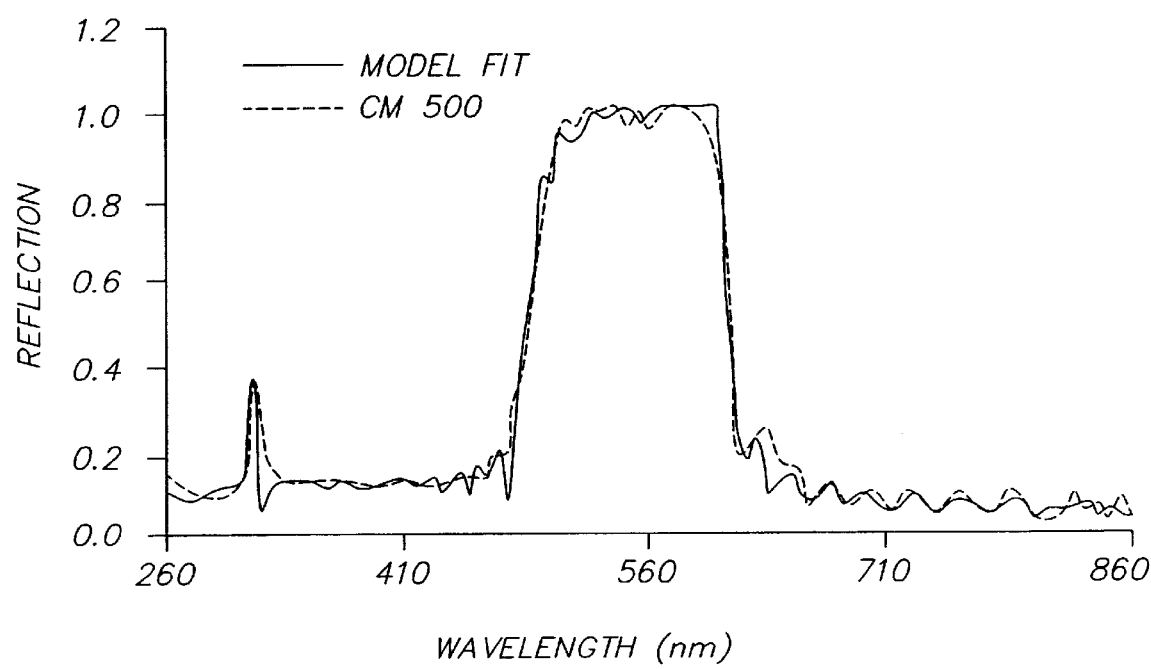
FIG. 3 is a typical spectral reflectance (reflectance vs. wavelength) of a commercially available CM 500 mirror (3M Corporation).
Figure 4:
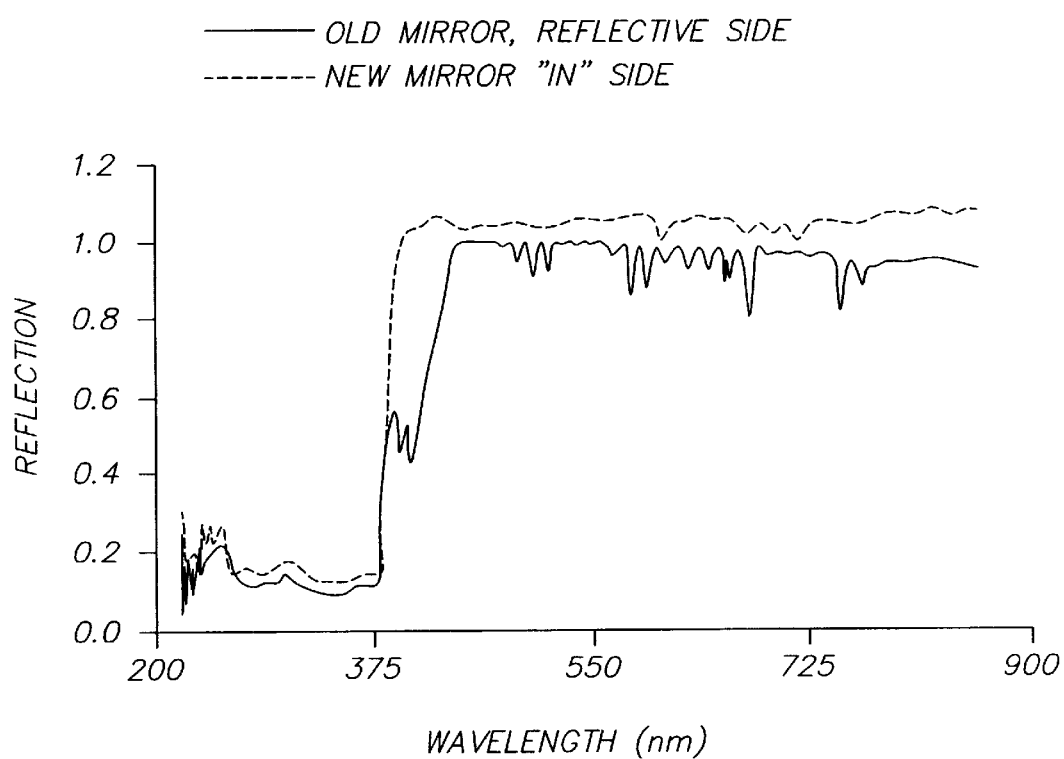
FIG. 4 is a typical spectral reflectance (reflection vs. wavelength) of a commercially available VM2000 mirror (3M Corporation).

Computer-modeled curves showing less than 1% transmission (99% reflectivity) for three commercial polymer multi-layer reflectors are illustrated in FIGS. 2–4. It should be understood that since there is no measurable absorbency by the reflectors that % reflectivity (or reflection) is approximated by the following relationship:

100−(% transmission)=(% reflectivity).

The preferred selected polymer optical layer coPEN or PMMA remains isotropic in refractive index and substantially matches the refractive index of the PEN layer associated with the transverse axis as illustrated in FIG. 1b. Light with its plane of polarization in this direction will be predominantly transmitted by the polarizer while light with its plane of polarization in the oriented direction will be reflected as illustrated in FIG. 1a.

For the polarizer, the PEN/selected optical layers have at least one axis for which the associated indices of refraction are preferably substantially equal. The match of refractive indices associated with that axis, which typically is the transverse axis, results in substantially no reflection of light in that plane of polarization. The selected polymer layer may also exhibit a decrease in the refractive index associated with the stretch direction. A negative birefringence of the selected polymer has the advantage of increasing the difference between indices of refraction of adjoining layers associated with the orientation axis while the reflection of light with its plane of polarization parallel to the transverse direction is still negligible. Differences between the transverse-axis-associated indices of refraction of adjoining layers after stretching should be less than 0.05 and preferably less than 0.02. Another possibility is that the selected polymer exhibits some positive birefringence due to stretching, but this can be relaxed to match the refractive index of the transverse axis of the PEN optical layers in a heat treatment. The temperature of this heat treatment should not be so high as to relax the birefringence in the PEN optical layers.

While the dielectric optical film may be isotropic or birefringent alternating layers, the polymeric multi-layer reflector used in the present invention is preferably a birefringence polymeric multi-layer film, and more preferably, the birefringent polymeric multi-layer reflector is designed so that the efficiency of reflectance of "p" polarized light can be controlled with angle. Such films are described in detail below.

The preferred multilayer polymeric supports of this invention are preferably pre-selected such that they are tuned to reflect radiation of the wavelength to which the photosensitive recording material is sensitized (activating wavelengths). Preferably, the reflector reflects at least 50% of the incident activating radiation. More preferably, it reflects at least 75%, and even more preferably at least 90% of the activating radiation. The types and concepts of polymeric multi-layer reflectors suitable for this invention are generally described in U.S. Pat. No. 5,882,774 (noted above), incorporated herein by reference. Specific materials and constructions must be designed to match with the photosensitive recording material and ultimate use.

In one aspect of the present invention, halation is substantially reduced by placing the thickest optical layers in a gradation of layers (in thickness from the topmost layer to the bottom most layer) of a wide angle polymeric multi-layer reflector near the top of the multi-layer stack to reflect all off-angle exposures near the interface between the photosensitive recording layer(s) and the multi-layer stack. The phosphor layer is directly adjacent the thinnest layer of the polymeric multi-layer reflector. However, if scattered off-angle rays pass through the reflector, then some halation will occur. An added antihalation layer in the photosensitive recording material can be used to absorb these rays to further improve image sharpness. In addition, use of a wide-angle polymeric multi-layer reflector will cause the photosensitive layer(s) to have additional photographic speed since a large percent of the rays will be reflected.

Preferred polymeric multi-layer reflectors used in the present invention exhibit relatively low absorption of incident light, as well as high reflectivity for both "s" and "p" polarized light at all angles of incidence.

Polymeric multi-layer reflectors useful in the invention also exhibit a Brewster angle (that is, the angle at which reflectance the "p" polarization, light parallel to the plane of incidence is very large or is nonexistent for the polymer layer interfaces). As a result, multi-layer stacks having high reflectivity for both "s" and "p" polarized light over a wide bandwidth, and over a wide range of angles can be achieved. For some aspects of the invention, reflectivity of "p" polarized light at high angles of incidence is desirable, and this cannot be done with isotropic material stacks.

The principles and design considerations described in U.S. Pat. No. 5,882;774 (noted above) can be applied to create multilayer stacks having the desired optical effects for a wide variety of circumstances and applications. The indices of refraction of the optical layers in the multilayer stack can be manipulated and tailored to produce the desired optical properties. Additional useful information on optical film is published in the article "Giant Birefringent Optics in Multilayer Polymer Mirrors", by Weber et al., Science, vol. 287, 2000, pp. 2451–2456.

A multilayer stack can include tens, hundreds, or thousands of optical layers, and each optical layer can be made from any of a number of different polymeric materials. The characteristics that determine the choice of polymeric materials for a particular stack depend upon the desired optical performance of the stack. The stack can contain as many polymeric materials as there are layers in the stack. For ease of manufacture, preferred optical thin film stacks contain only a few different polymer materials.

The preferred multilayer stack is comprised of low/high refractive index pairs of polymeric film layers, wherein each low/high refractive index pair of polymeric layers has a combined optical thickness of 0.5 the wavelength it is designed to reflect. Stacks of such polymeric films are commonly referred to as "quarterwave" stacks. If a wide-angle reflection is desired, the optical layers can have a gradation in thickness from one end of the stack to the other. For polymeric multi-layer reflectors designed for the visible and the near infrared wavelengths, a "quarterwave" stack design results in each of the optical layers in the multilayer stack having an average thickness of not more than about 0.5 $\mu$m. Additionally, it may be desirable to have the wide-angle polymeric multi-layer reflector with the thicker optical layers closest to the phosphor layer.

The number of optical layers is selected to achieve the desired optical properties using the minimum number of layers for reasons of thickness, flexibility, and economy. A larger number of optical layers may be required to provide reflectance of a larger variation in angle of incidence. In addition, to accommodate variation in angle of incidence the optical layers should have varying thickness. However, the number of optical layers is preferably less than 2,000, more preferably less than 1,000, and even more preferably less than 500.

In a preferred embodiment of this invention, the polymeric multi-layer reflector is made from at least two least two different polymers that are in adjacent optical layers to provide at least 6 repeating stacks. Greater than 6 optical layers are need to achieve a spectral reflectance of at least 40% for any given wavelength. With at least 50 layers, the total reflectance is above 90%. The addition of more layers provides an even broader spectral reflection across the wavelength spectrum.

One way to produce a polymeric multilayer reflector is to biaxially stretch a polymeric multilayer stack. For a high efficiency reflective film, average transmission along each stretch direction at normal incidence over the activating spectral region is desirably less than 50% (reflectance greater than 50%), preferably less than 25% (reflectance greater than 75%), more preferably less than 10% (reflectance greater than 90%), and even more preferably less than 5% (reflectance greater than 95%). In a preferred embodiment, the average transmission of light scattered at wide angles within the photosensitive layers over the activating spectral region is desirably less than 50% (reflectance greater than 50%), preferably less than 25% (reflectance greater than 75%), more preferably less than 10% (reflectance greater than 90%), and even more preferably less than 5% (reflectance greater than 95%).

As discussed above, the ability to achieve the desired relationships among the various indices of refraction, and thus the optical properties of the polymeric multi-layer reflector, is influenced by the processing conditions used to prepare it. In the case of organic polymers which can be oriented by stretching, the films are generally prepared by co-extruding the individual polymers to form a polymeric multi-layer reflector and then orienting the film by stretching at a selected temperature, optionally followed by heat-setting at a selected temperature.

One factor that determines the reflectance characteristics of the polymeric multi-layer polymeric reflector of the invention is the materials selected for the layers in the reflector. Many different materials may be used, and the exact choice of materials for a given application depends on the desired match and mismatch obtainable in the refractive indices between the various optical layers along a particular axis, as well on as the desired physical properties in the resulting product. For simplicity, useful films will be described further in reference to a stack made from only two materials, referred to herein as the first polymer and the second polymer.

The first and second optical layers and the optional non-optical layers of the polymeric multi-layer reflector of the present invention are typically composed of polymers such as polyesters. The term "polymer" will be understood to include homopolymers and copolymers, as well as polymers or copolymers that may be formed in a miscible blend, for example, by co-extrusion or by reaction, including, for example, transesterification. The terms "polymer", "copolymer", and "copolyester" include both random and block copolymers.

Polyesters for use in the polymeric multi-layer reflector of the present invention generally include carboxylate and glycol subunits and are generated by reactions of carboxylate monomer molecules with glycol monomer molecules. Each carboxylate monomer molecule has two or more carboxylic acid or ester functional groups and each glycol monomer molecule has two or more hydroxy functional groups. The carboxylate monomer molecules may all be the same or there may be two or more different types of molecules. The same applies to the glycol monomer molecules. Also included within the term "polyester" are polycarbonates derived from the reaction of glycol monomer molecules with esters of carbonic acid.

Suitable carboxylate monomer molecules for use in forming the carboxylate subunits of the polyester layers include, for example, 2,6-naphthalene dicarboxylic acid and isomers thereof, terephthalic acid, isophthalic acid, phthalic acid, azelaic acid, adipic acid, sebacic acid, norbornene dicarboxylic acid, bi-cyclooctane dicarboxylic acid, 1,6-cyclohexane dicarboxylic acid and isomers thereof, t-butyl isophthalic acid, trimellitic acid, sodium sulfonated isophthalic acid, 2,2'-biphenyl dicarboxylic acid and isomers thereof, and lower alkyl esters of these acids, such as methyl or ethyl esters. The term "lower alkyl" refers, in this context, to straight-chained or branched alkyl groups having 1 to 10 carbon atoms.

Suitable glycol monomer molecules for use in forming glycol subunits of the polyester layers include ethylene glycol, propylene glycol, 1,4-butanediol and isomers thereof, 1,6-hexanediol, neopentyl glycol, polyethylene glycol, diethylene glycol, tricyclodecanediol, 1,4-cyclohexanedimethanol and isomers thereof, norbornanediol, bicyclooctanediol, trimethylol propane, pentaerythritol, 1,4-benzenedimethanol and isomers thereof, bisphenol A, 1,8-dihydroxy biphenyl and isomers thereof, and 1,3-bis (2-hydroxyethoxy)benzene.

Preferred polyesters useful in the polymeric multi-layer reflectors of the present invention are poly(ethylene terephthalate) (PET), poly(ethylene 2,6-naphthalate) (PEN), and copolymers of each, that can be made, for example, by reaction of naphthalene dicarboxylic acid with ethylene glycol. PEN is frequently chosen as a first polymer because it has a large positive stress optical coefficient, retains birefringence effectively after stretching, and has little or no absorbency within the visible range. It also has a large index of refraction in the isotropic state. Its refractive index for polarized incident light of 550 nm wavelength increases when the plane of polarization is parallel to the stretch direction from about 1.64 to as high as about 1.9. Increasing molecular orientation increases the birefringence of PEN. The molecular orientation may be increased by stretching the material to greater stretch ratios and holding other stretching conditions fixed.

Another preferred first polymer is coPEN having an intrinsic viscosity (IV) of 0.48 dl/g. The index of refraction is approximately 1.63. This polymer is herein referred to as low melt PEN (90/10).

Still another preferred first polymer is PET having an inherent viscosity of 0.74 dl/g, available from Eastman Chemical Company (Kingsport, Tenn.).

Other semi-crystalline naphthalene dicarboxylic polyesters suitable as first polymers include but are not limited to, poly(butylene 2,6-naphthalate) (PBN), poly(ethylene terephthalate) (PET), and copolymers thereof.

Non-polyester polymers are also useful in creating polymeric multi-layer reflectors. For example, polyether imides can be used in mixtures with polyesters, such as PEN and coPEN, to generate a polymeric multi-layer reflective reflector. Other polyester/non-polyester combinations, such as polyethylene terephthalate and polyethylene (for example, those available under the trade designation Engage 8200 from Dow Chemical Corp., Midland, Mich.), can be used.

The second polymer should be chosen so that in the finished film, the refractive index, in at least one direction, differs significantly from the index of refraction of the first polymer in the same direction. Because polymeric materials are typically dispersive (that is, the refractive indices vary with wavelength), these conditions must be considered in terms of a particular spectral bandwidth of interest. It will be understood from the foregoing discussion that the choice of a second polymer is dependent not only on the intended application of the polymeric multi-layer reflector in question, but also on the choice made for the first polymer, as well as processing conditions.

The second optical layers can be made from a variety of second polymers having glass transition temperature compatible with that of the first polymer and having an in-plane refractive index substantially different from the refractive index of the first polymer after orientation of the polymeric multi-layer reflector. Examples of suitable second polymers include vinyl polymers and copolymers made from ethylenically unsaturated polymerizable monomers such as vinyl naphthalenes, styrene, maleic anhydride, acrylates, and methacrylates. Examples of such polymers include polyacrylates, polymethacrylates, such as poly(methyl methacrylate) (PMMA), and isotactic or syndiotactic polystyrene. Other useful non-vinyl polymers include condensation polymers such as polysulfones, polyamides, polyurethanes, polyamic acids, and polyimides. In addition, the second optical layers can be formed from polymers and copolymers such as polyesters and polycarbonates.

Preferred second polymers include homopolymers of poly (methylmethacrylate) (PMMA), such as those available from Ineos Acrylics, Inc. (Wilmington, Del.), under the tradenames CP71 and CP80, or poly(ethyl methacrylate) (PEMA) that has a lower glass transition temperature than PMMA. Additional preferred second polymers include copolymers of PMA (coPMMA), such as a coPMMA made from 75 weight % methylmethacrylate (MMA) monomers and 25 weight % ethyl acrylate (EA) monomers, (available from Ineos Acrylics, Inc. under the tradename Perspex CP63), a coPMMA formed with MMA comonomer units and n-butyl methacrylate (nBMA) comonomer units, or a blend of PMMA and poly(vinylidene fluoride) (PVDF) such as that available from Solvay Polymers, Inc. (Houston, Tex.) under the tradename Solef 1008.

Yet other preferred second polymers include polyolefin copolymers such as poly(ethylene-co-octene) (PE-PO) available from Dow-Dupont Elastomers under the tradename Engage 8200, poly(propylene-co-ethylene) (PPPE) available from Fina Oil and Chemical Co. (Dallas, Tex.) under the tradename Z9470, and a copolymer of atactic polypropylene (aPP) and isotactic polypropylene (iPP) available from Huntsman Chemical Corp. (Salt Lake City, Utah) under the tradename Rexflex W111. Second optical layers can also be made from a functionalized polyolefin, such as linear low density polyethylene-g-maleic anhydride (LLDPE-g-MA) such as that available from E.I. duPont de Nemours & Co., Inc. (Wilmington, Del.) under the tradename Bynel 4105.

The thin film optical design of the polymeric multi-layer reflector useful in the present invention that provides narrow band reflection places certain requirements on the indices of refraction of the constituent layers. For a multilayer stack designed to reflect a narrow band of wavelengths at substantially only one angle near normal incidence, an alternating stack of isotropic polymers can be used, and the index differential between alternating layers need not be very large. For such a reflector to perform over a wide range of angles, it is preferable that the in-plane index differentials (n1x−n2x and n1y−n2y) both be relatively large. The wider the range of angles, the more layers are required in the stack design. A larger index differential allows for reflector designs with fewer layers. Index differentials of at least 0.03 are needed. A differential of 0.1 is preferable, and 0.15 is even more preferable. Whereas isotropic materials can be used to fabricate a reflector that performs well at near normal angles of incidence to the film plane, a birefringent polymeric multilayer reflector is preferred for large angles of incidence. Assuming that the material has the higher in-plane refractive indices such that n1x>n2x, and n1y>n2y, it is preferable that n1z≦n2z (that is, the z index differential) preferably has the opposite sign as the in-plane index differential. Compared to isotropic multi-layer materials, the reflectivity of a polymeric multilayer reflector is improved at oblique angles whenever the z indices of refraction have a smaller difference, including negative values, than the in-plane index differences in the multilayer.

For example, at a specific wavelength, the in-plane refractive indices might be 1.76 for biaxially oriented PEN while the film plane normal refractive index might fall to 1.49. When PMMA is used as the second polymer in the multilayer construction, its refractive index at the same wavelength, in all three directions, might be 1.495. Another example is the PET/Ecdel system, in which the analogous refractive indices might be 1.66 and 1.51 for PET, while the isotropic index of Ecdel might be 1.52.

In addition to the first and second optical layers described above, the polymeric multi-layer reflectors of the present invention optionally include one or more non-optical layers such as one or more protective boundary layers as outer surface layers or as interior non-optical layers between packets of optical layers. Non-optical layers can be used to give the reflector physical integrity or strength or to protect it from damage during or after processing. For some applications, it may be desirable to include sacrificial protective layer(s) wherein the interfacial adhesion between the protective layer(s) and the stack of optical layers is controlled so that the protective layers can be stripped from the stack before use.

The non-optical layers may be formed from a variety of polymers, such as polyesters, including any of the polymers used in the first and second optical layers. In some embodiments, the material selected for the non-optical layers is similar to or the same as the material selected for the second optical layers. The use of coPEN, coPET, or other copolymer material for protective layers reduces the breaking apart of a film due to strain-induced crystallinity and alignment of a majority of the polymer molecules in the direction of orientation. The coPEN of the non-optical layers typically orients very little when stretched under the conditions used to orient the first optical layers, and so there is little strain-induced crystallinity.

The protective layers and other optional non-optical layers can be thicker than, thinner than, or the same thickness as the first and second optical layers. The thickness of the protective layers and optional non-optical layers is generally at least four times, typically at least 10 times, and can be at least 100 times, the thickness of at least one of the individual first and second optical layers. The thickness of the non-optical layers can be varied to make a polymeric multi-layer reflector having a particular thickness.

A protective layer may be co-extruded on one or both major surfaces of the stack of optical layers during its manufacture to protect the stack from high shear along the feedblock and die walls. Often an outer protective layer with the desired chemical or physical properties can be obtained by mixing an additive, such as, for example, a UV stabilizer, into the polymer melt that makes up the protective layer, and co-extruding the protective layer with altered properties onto one or both sides of the stack during manufacture.

Techniques for manufacturing polymeric multi-layer films are described in detail in U.S. Pat. No. 3,308,508 (Schrenk) and U.S. Pat. No. 5,976,424 (Weber et al.), both incorporated herein by reference.

Preferably, the polymeric multi-layer reflectors described herein are used as supporting materials on which one or more prompt-emitting phosphor layers are disposed (directly or over subbing or primer layers). The phosphor layers can be directly coated onto the reflector that may be treated (such as with corona discharge) to improve adhesion, or intermediate subbing or other adhesion-promoting layers can be applied on the reflector. Useful subbing layer formulations include those used for photographic materials including vinylidene halide polymers.

Additional layers known to be useful in radiographic phosphor panels may be added. Examples of such layers include antistatic layers and protective topcoat layers. Additional layers may be co-extruded on the outside of the skin layers during manufacture of the multilayer film. They may be coated onto the polymeric multi-layer reflector and/or phosphor layer in a separate coating operation, or they may be laminated as a separate film, foil, or rigid or semi-rigid reinforcing substrate.

The radiographic phosphor panels of this invention comprise one or more continuous or discontinuous phosphor layers comprising prompt-emitting fluorescent phosphor particles dispersed in one or more film forming binders. The phosphors useful in this invention have a significant portion of their emitted wavelength between 300 and 800 nm of the electromagnetic spectrum.

A wide variety of phosphors can be used in the practice of this invention. Phosphors are materials that emit infrared, visible, or ultraviolet radiation upon excitation. An intrinsic phosphor is a material that is naturally (that is, intrinsically) phosphorescent. An "activated" phosphor is one composed of a basic material that may or may not be an intrinsic phosphor, to which one or more dopant(s) has been intentionally added. These dopants "activate" the phosphor and cause it to emit infrared, visible, or ultraviolet radiation. For example, in $Gd_2O_2S$:Tb, the Tb atoms (the dopant/activator) give rise to the optical emission of the phosphor.

Any conventional or useful phosphor can be used, singly or in mixtures, in the practice of this invention. More specific details of useful phosphors are provided as follows.

For example, useful phosphors are described in numerous references relating to prompt-emitting fluorescent intensifying screens, including but not limited to, *Research Disclosure*, Vol. 184, August 1979, Item 18431, Section IX, X-ray Screens/Phosphors, and U.S. Pat. No. 2,303,942 (Wynd et al.), U.S. Pat. No. 3,779,615 (Luckey), U.S. Pat. No. 4,032,471 (Luckey), U.S. Pat. No. 4,225,653 (Brixner et al.), U.S. Pat. No. 3,418,246 (Royce), U.S. Pat. No. 3,428,247 (Yocon), U.S. Pat. No. 3,725,704 (Buchanan et al.), U.S. Pat. No. 2,725,704 (Swindells), U.S. Pat. No. 3,617,743 (Rabatin), U.S. Pat. No. 3,974,389 (Ferri et al.), U.S. Pat. No. 3,591,516 (Rabatin), U.S. Pat. No. 3,607,770 (Rabatin), U.S. Pat. No. 3,666,676 (Rabatin), U.S. Pat. No. 3,795,814 (Rabatin), U.S. Pat. No. 4,405,691 (Yale), U.S. Pat. No. 4,311,487 (Luckey et al.), U.S. Pat. No. 4,387,141 (Patten), U.S. Pat. No. 5,021,327 (Bunch et al.), U.S. Pat. No. 4,865,944 (Roberts et al.), U.S. Pat. No. 4,994,355 (Dickerson et al.), U.S. Pat. No. 4,997,750 (Dickerson et al.), U.S. Pat. No. 5,064,729 (Zegarski), U.S. Pat. No. 5,108,881 (Dickerson et al.), U.S. Pat. No. 5,250,366 (Nakajima et al.), U.S. Pat. No. 5,871,892 (Dickerson et al.), EP-A-0 491,116 (Benzo et al.), the disclosures of all of which are incorporated herein by reference with respect to the phosphors.

Useful classes of phosphors include, but are not limited to, calcium tungstate ($CaWO_4$), niobium and/or rare earth activated or unactivated yttrium, lutetium, or gadolinium tantalates, rare earth (such as terbium, lanthanum, gadolinium, cerium, and lutetium)-activated or unactivated middle chalcogen phosphors such as rare earth oxychalcogenides and oxyhalides, and terbium-activated or unactivated lanthanum and lutetium middle chalcogen phosphors.

Still other useful phosphors are those containing hafnium as described for example in U.S. Pat. No. 4,988,880 (Bryan et al.), U.S. Pat. No. 4,988,881 (Bryan et al.), U.S. Pat. No. 4,994,205 (Bryan et al.), U.S. Pat. No. 5,095,218 (Bryan et al.), U.S. Pat. No. 5,112,700 (Lambert et al.), U.S. Pat. No. 5,124,072 (Dole et al.), and U.S. Pat. No. 5,336,893 (Smith et al.), the disclosures of which are all incorporated herein by reference.

Preferred rare earth oxychalcogenide and oxyhalide phosphors are represented by the following formula (1):

$$M'_{(w-n)}M''_nO_wX' \qquad (1)$$

wherein M' is at least one of the metals yttrium (Y), lanthanum (La), gadolinium (Gd), or lutetium (Lu), M" is at least of the rare earth metals, preferably dysprosium (Dy), erbium (Er), europium (Eu), holmium (Ho), neodymium (Nd), praseodymium (Pr), samarium (Sm), tantalum (Ta), terbium (Tb), thulium (Tm), or ytterbium (Yb), X' is a middle chalcogen (S, Se, or Te) or halogen, n is 0.0002 to 0.2, and w is 1 when X' is halogen or 2 when X' is a middle chalcogen. These include rare earth-activated lanthanum oxybromides, and terbium-activated or thulium-activated gadolinium oxysulfides such as $Gd_2O_2S$:Tb.

Other suitable phosphors are described in U.S. Pat. No. 4,835,397 (Arakawa et al.) and U.S. Pat. No. 5,381,015 (Dooms), both incorporated herein by reference, and including for example divalent europium and other rare earth activated alkaline earth metal halide phosphors and rare earth element activated rare earth oxyhalide phosphors. Of these types of phosphors, the more preferred phosphors include alkaline earth metal fluorohalide storage phosphors [particularly those containing iodide such as alkaline earth metal fluorobromo-iodide storage phosphors as described in U.S. Pat. No. 5,464,568 (Bringley et al.), incorporated herein by reference].

Another class of phosphors includes a rare earth host and are rare earth activated mixed alkaline earth metal sulfates such as europium-activated barium strontium sulfate.

Particularly useful phosphors are those containing doped or undoped tantalum such as $YTaO_4$, $YTaO_4$:Nb, Y(Sr)$TaO_4$, and Y(Sr)$TaO_4$:Nb. These phosphors are described in U.S. Pat. No. 4,226,653 (Brixner), U.S. Pat. No. 5,064,729 (Zegarski), U.S. Pat. No. 5,250,366 (Nakajima et al.), and U.S. Pat. No. 5,626,957 (Benso et al.), all incorporated herein by reference.

Other useful phosphors are alkaline earth metal phosphors that can be the products of firing starting materials comprising optional oxide and a combination of species characterized by the following formula (2):

$$MFX_{1-z}I_zuM^aX^a:yA:eQ:tD \quad (2)$$

wherein "M" is magnesium (Mg), calcium (Ca), strontium (Sr), or barium (Ba), "F" is fluoride, "X" is chloride (Cl) or bromide (Br), "I" is iodide, $M^a$ is sodium (Na), potassium (K), rubidium (Rb), or cesium (Cs), $X^a$ is fluoride (F), chloride (Cl), bromide (Br), or iodide (I), "A" is europium (Eu), cerium (Ce), samarium (Sm), or terbium (Th), "Q" is BeO, MgO, CaO, SrO, BaO, ZnO, $Al_2O_3$, $La_2O_3$, $In_2O_3$, $SiO_2$, $TiO_2$, $ZrO_2$, $GeO_2$, $SnO_2$,:$Nb_2O_5$, $Ta_2O_5$, or $ThO_2$, "D" is vanadium (V), chromium (Cr), manganese (Mn), iron (Fe), cobalt (Co), or nickel (Ni). The numbers in the noted formula are the following: "z" is 0 to 1, "u" is from 0 to 1, "y" is from $1 \times 10^{-4}$ to 0.1, "e" is form 0 to 1, and "t" is from 0 to 0.01. These definitions apply wherever they are found in this application unless specifically stated to the contrary. It is also contemplated that "M", "X", "A", and "D" represent multiple elements in the groups identified above.

Examples of useful phosphors include: SrS:Ce,SM, SrS:Eu,Sm, $ThO_2$:Er, $La_2O_2S$:Eu,Sm,ZnS:Cu,Pb, and others described in U.S. Pat. No. 5,227,253 (Takasu et al.), incorporated herein by reference.

Phosphors can be used in any conventional particle size range and distribution. It is generally appreciated that sharper images are realized with smaller mean particle sizes, but light emission efficiency declines with decreasing particle size. Thus, the optimum mean particle size for a given application is a reflection of the balance between imaging speed and image sharpness desired. Conventional phosphor particle size ranges and distributions are illustrated in the phosphor teachings cited above.

One preferred method of formation of the radiographic phosphor panel embodies a method of producing the phosphor panel comprising a supported layer of phosphor particles dispersed in one or more binders and a protective coating thereover wherein the one or more binders consist essentially of one or more elastomeric and/or rubbery polymers and wherein the panel is prepared by the steps of dispersing phosphor particles in a binding medium consisting essentially of the elastomeric polymers, coating the dispersed phosphor particles so as to form a phosphor layer on the polymeric multi-layer reflector without compressing the resulting dried phosphor layer, and coating a protective coating thereover.

Such rubbery and/or elastomeric polymers can be thermoplastic elastomers or thermoplastic polyurethanes. These materials are preferred because they a tough polymers and provide good abrasion resistance to the phosphor panel. Other details of preparing phosphor layers and overcoats are well known in the art cited above.

The fluorescent layer contains sufficient binder to give structural coherence to the layer. The binders can be any of those conventionally used in phosphor panels. Such binders are generally chosen from organic polymers that are transparent to X-radiation and emitted radiation, such as the sodium o-sulfobenzaldehyde acetal of poly(vinyl alcohol), chlorosulfonated poly(ethylene), a mixture of macromolecular bisphenol poly(carbonates) and copolymers comprising bisphenol carbonates and poly(alkylene oxides), aqueous ethanol soluble nylons, poly(alkyl acrylates and methacrylates) and copolymers of alkyl acrylates and methacrylates with acrylic and methacrylic acid, and poly(vinyl butyral); and poly(urethane) elastomers. These and other useful binders are disclosed for example, in *Research Disclosure*, Vol. 154, February 1977, Item 15444, and Vol. 182, June 1979. Particularly preferred binders are poly (urethanes), such as those commercially available under the trademark ESTANE from Goodrich Chemical Co., the trademark PERMUTHANE from the Permuthane Division of ICI, Ltd., and the trademark CARGILL from Cargill, Inc.

As noted above, it is specifically contemplated to employ the radiographic phosphor panels of this invention in combination with one or more photosensitive recording materials such as silver halide radiographic films. The photosensitive recording materials and front and/or back radiographic phosphor panels are usually mounted in direct contact in a suitable cassette to form an imaging assembly. X-radiation in an imagewise pattern is passed through and partially absorbed in a front panel, and a portion of the absorbed X-radiation is re-emitted as a visible light image that exposes the silver halide emulsion units of the recording material.

Useful photosensitive radiographic materials are well known in the art, and are described for example in numerous patents and publications. They generally comprise a support having a single silver halide emulsion unit on each side thereof. Such units include one or more silver halide emulsion layers and optionally one or more hydrophilic non-photosensitive layers (such as protective overcoats and interlayers). Further details of the support and silver halide emulsion units are provided below.

In their simplest construction, the radiographic recording materials include a single silver halide emulsion layer on each side of the support. Preferably, however, there is also an interlayer and a protective overcoat on each side the support. General features of radiographic films are described in U.S. Pat. No. 5,871,892 (Dickerson et al.), which is incorporated herein by reference with respect to those films.

Any conventional transparent radiographic or photographic film support can be employed in constructing the films. Radiographic film supports usually are constructed of polyesters to maximize dimensional integrity and are blue tinted to contribute the cold (blue-black) image tone sought in the fully processed films. Radiographic film supports, including the incorporated blue dyes that contribute to cold image tones, are described in *Research Disclosure*, Item 18431, cited above, Section XII. Film Supports. *Research Disclosure*, Vol. 365, September 1994, Item 36544, Section XV. Supports, illustrates in paragraph (2) suitable subbing layers to facilitate adhesion of hydrophilic colloids to the support. Although the types of transparent films set out in Section XV, paragraphs (4), (7) and (9) are contemplated, due to their superior dimensional stability, the transparent films preferred are polyester films, illustrated in Section XV, paragraph (8). Poly(ethylene terephthalate) and poly (ethylene naphthalate) are specifically preferred polyester film supports.

The transparent support can be subbed using conventional subbing materials that would be readily apparent to one skilled in the art.

The emulsion layers in the radiographic recording materials contain the light-sensitive high silver bromide relied upon for image formation. To facilitate rapid access processing the grains preferably contain less than 2 mol % (mole percent) iodide, based on total silver. The silver halide grains are predominantly silver bromide in content. Thus, the grains can be composed of silver bromide, silver iodobromide, silver chlorobromide, silver iodochlorobromide, silver chloroiodobromide or silver iodochlorobromide as long as bromide is present in an amount of at least 95 mol % (preferably at least 98 mol %) based on total silver content.

In addition to the advantages obtained by composition selection described above it is specifically contemplated to employ silver halide grains that exhibit a coefficient of variation (COV) of grain ECD of less than 20% and, preferably, less than 10%. It is preferred to employ a grain population that is as highly monodisperse as can be conveniently realized.

In addition, preferably at least 50% (and preferably at least 70%) of the silver halide grain projected area is provided by tabular grains having an average aspect ratio greater than 8, and preferably greater than 12. Tabular grains are well known and described in numerous publications including, but not limited to, U.S. Pat. No. 4,414,310 (Dickerson), U.S. Pat. No. 4,425,425 (Abbott et al.), U.S. Pat. No. 4,425,426 (Abbott et al.), U.S. Pat. No. 5,021,327 (Bunch et al.), U.S. Pat. No. 5,147,771 (Tauer et al.), and U.S. Pat. No. 5,582,965 (Deaton et al.), all incorporated herein by reference.

Both silver bromide and silver iodide have significant native sensitivity within the blue portion of the visible spectrum. Hence, when the emulsion grains contain high (>50 mol %, based on total silver) bromide concentrations, spectral sensitization of the grains is not essential, though still preferred. It is specifically contemplated that one or more spectral sensitizing dyes will be absorbed to the surfaces of the grains to impart or increase their light-sensitivity. Ideally the maximum absorption of the spectral sensitizing dye is matched (for example, within ±10 nm) to the principal emission band or bands of the radiographic phosphor panel.

The radiographic films generally include a surface overcoat on each side of the support that is typically provided for physical protection of the emulsion layers. In addition to vehicle features discussed above the overcoats can contain various addenda to modify the physical properties of the overcoats. Such addenda are illustrated by *Research Disclosure*, Item 36544, Section IX. Coating physical property modifying addenda, A. Coating aids, B. Plasticizers and lubricants, C. Antistats, and D. Matting agents. Interlayers that are typically thin hydrophilic colloid layers can be used to provide a separation between the emulsion layers and the surface overcoats. It is quite common to locate some emulsion compatible types of surface overcoat addenda, such as anti-matte particles, in the interlayers.

Some conventional radiographic materials that can be used in the practice of the present invention include, but are not limited to, various KODAK T-MAT Radiographic Films, various KODAK INSIGHT Radiographic Films, KODAK X-OMAT Duplicating Film, various KODAK EKTASCAN Radiographic Films, KODAK CFT, CFL, CFS and CFE Radiographic Films, KODAK EKTASPEED and EKTASPEED PLUS Dental Films, KODAK ULTRASPEED Dental Film, KODAK X-OMAT K Film, KODAK X_OMAT UV Film, KODAK Min-R 2000 Mammography Film, and KODAK Min-R L Mammography Film.

Metal intensifying screens can also be used in the practice of this invention, or included within the imaging assemblies of the invention. The metal intensifying screens can also take any convenient conventional form. While the metal intensifying screens can be formed of many different types of materials, the use of metals is most common, since metals are most easily fabricated as thin foils, often mounted on radiation transparent backings to facilitate handling. Convenient metals for screen fabrication are in the atomic number range of from 22 (titanium) to 82 (lead). Metals such as copper, lead, tungsten, iron and tantalum have been most commonly used for screen fabrication with lead and copper in that order being the most commonly employed metals. Generally the higher the atomic number, the higher the density of the metal and the greater its ability to absorb MVp X-radiation.

Figure 5:
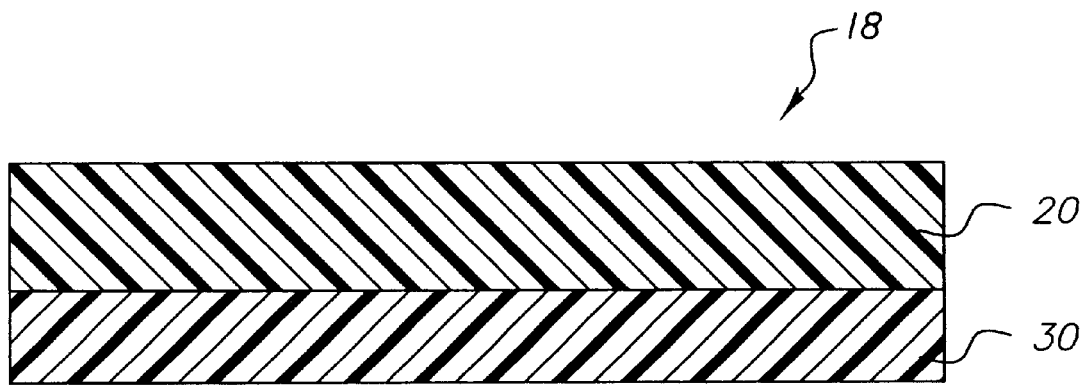
FIG. 5 is an enlarged cross-sectional view of a radiographic phosphor panel of this invention comprising the basic essential components.

The present invention can be further understood by reference the FIGS. 5–8. In FIG. 5, radiographic phosphor panel 18 is shown as composed of phosphor layer 20 disposed on polymeric multi-layer reflector 30.

Figure 6:
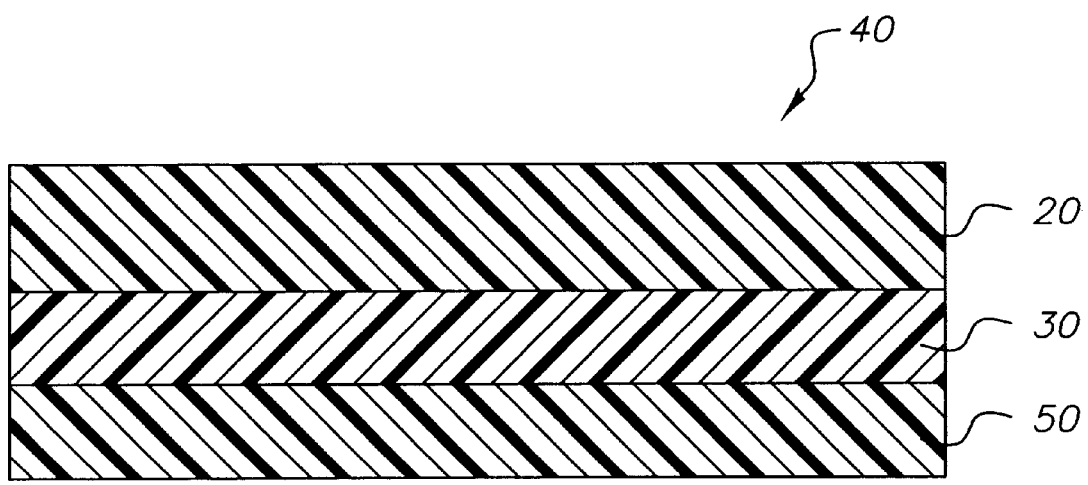
FIG. 6 is an enlarged cross-sectional view of another embodiment of a radiographic phosphor panel of this invention further comprising a transparent supporting substrate.

Another embodiment of this invention is shown in FIG. 6 wherein radiographic phosphor panel 40 is shown as composed of phosphor layer 20 disposed on polymeric multi-layer reflector 30 that is further disposed on transparent supporting substrate 50.

Figure 7:
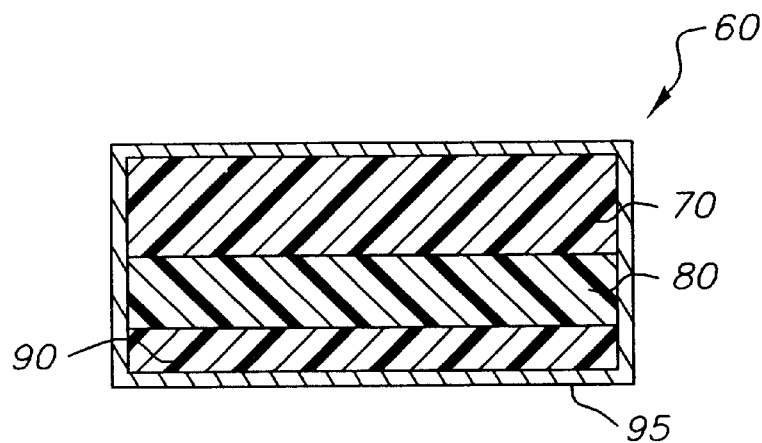
FIG. 7 is an enlarged cross-sectional view of an imaging assembly of this invention comprising a radiographic phosphor panel and a photosensitive recording material.

An imaging assembly 60 of this invention is shown in FIG. 7 as having photosensitive recording material 70 arranged in association with a radiographic phosphor panel comprised of phosphor layer 80 disposed on polymeric multi-layer reflector 90 in cassette holder 95.

Figure 8:
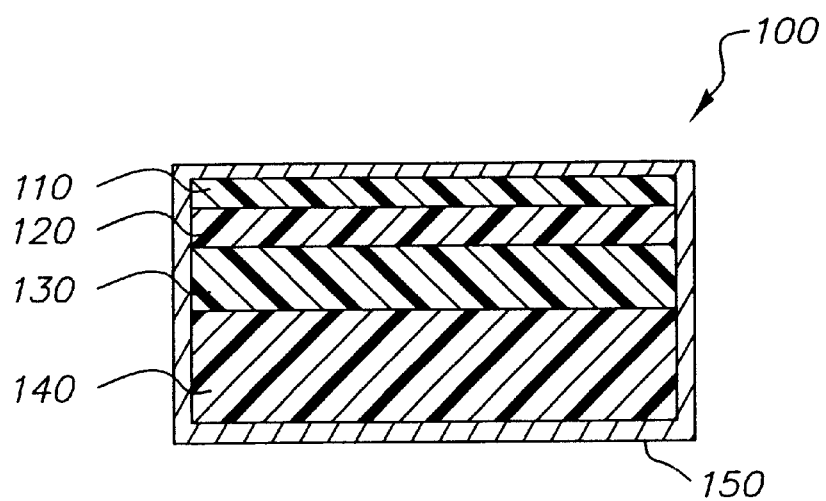
FIG. 8 is an enlarged cross-sectional view of another imaging assembly embodiment further comprising a metal intensifying screen.

Another embodiment of the invention is illustrated in FIG. 8 wherein imaging assembly 100 comprises metal intensifing screen 110 arranged in association with a radiographic phosphor panel comprising phosphor layer 130 and polymeric multi-layer reflector 120 arranged in association with photosensitive recording material 140 in cassette holder 150.

The preparation of several polymeric multi-layer reflectors useful in the practice of this invention are now described.

Polymeric Support Reflective (CM590)

A multilayer stack containing about 344 layers was made on a sequential flat-film making line via a co-extrusion process (see TABLE I below). The overall finished thickness was approximately 52.3 μm. This multilayer polymer film was made with alternating layers of PEN and PMMA. A feedblock method (such as that described by U.S. Pat. No. 3,801,429) was used to generate multiple layers with an approximately linear layer thickness gradient from layer to layer through the extrudate. Polyethylene naphthalate (PEN-60 weight % phenol/40 weight % dichlorobenzene) with an Intrinsic Viscosity (IV) of 0.48 dl/g was delivered to the feedblock by one extruder at a rate of 37.9 kg/hr. The PMMA was directed to the feedblock by a second extruder at a rate of 40.4 kg/hr.

The feedblock used to make the reflector was designed to give a linear layer thickness distribution with a 1.25:1 ratio of thickest to thinnest layers under isothermal conditions.

After the feedblock, the same PEN extruder delivered PEN as protective boundary layers (PBL's), where the PBL's had the same thickness on both sides of the optical layer's meltstream) to the meltstream at about 23 kg/hr. The material stream was then passed though an asymmetric 2× multiplier [see U.S. Pat. No. 5,094,788 (Schrenk et al.) and U.S. Pat. No. 5,094,793 (Shrenck et al.), both incorporated herein by reference] with a multiplier ratio of about 1.50. The multiplier ratio is defined as the average layer thickness of layers produced in the major conduit divided by the average layer thickness of layers in the minor conduit. Each set of multiple layers has the approximate layer thickness profile created by the feedblock, with overall thickness scale factors determined by the multiplier design and film extrusion rates. Although this multiplier ratio leaves a slight spectral reflectance gap between the two reflectance bands created by the two sets of multiple layers, this setup was chosen to produce the layers combination needed to provide the primary reflectance of between 475 to 550 nm. After the multiplier, a thick symmetric protective layer was added at about 34.5 kg/hr that was fed from a third extruder. Then the material stream was passed through a film die and onto a water-cooled casting wheel using an inlet water temperature of about 7° C. The PMMA melt process equipment was maintained at about 250° C., the PEN melt process equipment was maintained at about 285° C., and the feedblock, multiplier, and die were also maintained at about 285° C.

A high voltage pinning system was used to pin the extrudate to the casting wheel. The pinning wire was about 0.17 mm thick and a voltage of about 5.5 kV was applied. The pinning wire was positioned manually to about 2 to 3 mm from the web at the point of contact to the casting wheel to obtain a smooth appearance to the cast web. The cast web was continuously oriented by conventional sequential length orienter (LO) and tenter equipment.

The web was length oriented to a draw ratio of about 3.3 at about 130° C. The film was preheated to about 138° C. in about 28 seconds in the tenter and drawn at about 140° C. in the transverse direction to a draw ratio of about 5.5 at a rate of about 15% per second. The film was then heat set for about 24 seconds at about 227° C. The casting wheel speed was adjusted for precise control of final film thickness, and therefore, final wavelength selection of the reflector.

CM590 film as obtained from 3M Corporation was optically characterized as follows. Reflection spectra (90 degree incidence, spectral region is 220 to 858 nm) were acquired with a Filmetrics F-20UV reflectometer. These spectra were modeled using WVASE32 software (J.A. Woollam Co.). As noted the two curves in FIG. 2 are very close in overall reflectance. For the intended use in radiographic phosphor panels, the performances of the two films are considered the same. The high refractive index polymer is either poly(ethylene terephthalate) or poly(ethylene naphthalate) and the low index polymer is a poly(methylmethacrylate). TABLE I below provides a more detailed structure of two refractive index polymers with which they're two different stack orders of slightly different thickness.

TABLE I

| | | |
|---|---|---|
| L7 PEN High refractive index polymer | 0.101 μm | 42 Repeats |
| L6 PMMA Low refractive index polymer | 0.102 μm | |
| L5 PEN High refractive index polymer | 0.107 μm | 19 Repeats |
| L4 PMMA Low refractive index polymer | 0.107 μm | |
| L3 PEN High refractive index polymer | 0.090 μm | 220 Repeats |
| L2 PMMA Low refractive index polymer | 0.090 μm | |
| L1 PEN High refractive index polymer | 0.074 μm | Single layer |

There is a 42 order stack repeat of L7 and L6, a 19 order stack repeat of L5 and L4, and a 220 stack order repeat of L3 and L2 on top of L1.

CM 500 film would be made in a similar fashion to obtain the desired layer thickness, and repeat patterns would be as shown in the following TABLE II:

TABLE II

| | | |
|---|---|---|
| L7 PEN High refractive index polymer | 0.089 μm | 75 Repeats |
| L6 PMMA Low refractive index polymer | 0.098 μm | |
| L5 PEN High refractive index polymer | 0.086 μm | 22 Repeats |
| L4 PMMA Low refractive index polymer | 0.086 μm | |
| L3 PEN High refractive index polymer | 0.107 μm | 19 Repeats |
| L2 PMMA Low refractive index polymer | 0.049 μm | |
| L1 PEN High refractive index polymer | 5.480 μm | Single layer |

There is an alternating high/low refractive index stack of L7 and L6 that is repeated 75 times that is on top of another alternating stack of L5 and L4 that is repeated 22 times that is on top of another alternating stack of L3 and L2 that is repeated 19 times that is adjacent to a single 5.48 μm layer of high refractive index polymer. The overall thickness is approximately 1.04 mils (0.0026 cm) thick and has approximately 233 layers. The spectral reflectance of CM 500 is as shown in FIG. 3.

3M's VM2000 radiance mirror has a total thickness of approximately 75 μm. Since this film has a much broader spectral reflectance across the visible and near IR region of the spectrum more layers are needed. TABLE III below was generated by an optical model (using WVASE32 software (J.A. Woollam Co.) and is a close approximation of the VM2000 mirror.

TABLE III

| | | |
|---|---|---|
| PEN High refractive index polymer | 0.062 μm | Repeat 56 times |
| PMMA Low refractive index polymer | 0.062 μm | |
| PEN High refractive index polymer | 0.071 μm | Repeat 56 times |
| PMMA Low refractive index polymer | 0.071 μm | |
| PEN High refractive index polymer | 0.080 μm | Repeat 56 times |
| PMMA Low refractive index polymer | 0.080 μm | |
| PEN High refractive index polymer | 0.091 μm | Repeat 56 times |
| PMMA Low refractive index polymer | 0.091 μm | |
| PEN High refractive index polymer | 0.103 μm | Repeat 56 times |
| PMMA Low refractive index polymer | 0.103 μm | |
| PEN High refractive index polymer | 0.117 μm | Repeat 56 times |
| PMMA Low refractive index polymer | 0.117 μm | |
| PEN High refractive index polymer | 0.131 μm | Repeat 56 times |
| PMMA Low refractive index polymer | 0.131 μm | |

The following examples illustrate the practice of this invention. They are not intended to be exhaustive of all possible variations of the invention. Parts and percentages are by weight unless otherwise indicated.

EXAMPLES 1–3

Several supporting substrates were prepared for use in the preparation of radiographic phosphor panels. A control support, Support A, was a poly(ethylene terephthalate) support containing 3–5% (by weight) carbon black. Supports B, C, and D were polymer multi-layer reflectors. Support B was CM500 (3M Corporation), Support C was CM590 (3M Corporation) and Support D was VM2000 (3M Corporation). The reflectance of the supports at 545 nm to light incident normal to the reflector were <5% for Support A and >95% for each of supports B, C, and D. The reflectance of Supports B and C declined as the incident angle decreased past 45 degrees. The reflectance of support D was essentially constant across all angles of incidence.

A dispersion of terbium-doped gadolinium oxysulfide phosphor, having a mean particle size of approximately 5 μm was prepared from 100 g of the phosphor in a solution prepared from 5 g of polyurethane binder (PERMUTHANE U-6366) at 10% (by weight) in a 93:7 volume ratio of dichloromethane and methanol. The resulting dispersion was coated using a knife blade onto the supports that were held fast to an aluminum coating plate maintained at 10° C. The knife blade was adjusted to provide phosphor coverage of about 50 g/ft$^2$ (540 g/m$^2$) on each support. Phosphor coverage was measured gravimetrically after the coatings had been thoroughly dried.

For the sensitometric (speed) evaluation, each panel was placed in contact with a commercially available single emulsion radiographic film (MinR2000, Eastman Kodak Co.) in a light-tight cassette (to form an imaging assembly). These imaging assemblies were then used to image a "bone and bead" test object containing bone, plastic objects, steel wool, and miscellaneous objects having fine detail, using a Philips CP80 high frequency X-ray generator operated at and 70 KVp, with 1.02 mm aluminum beam filtration and at a focal-film distance of 50 inches (127 cm). There were 2.375 inches (6 cm) of Lucite placed at the collimator during exposures to provide additional tube loading. Tube current (mA) was adjusted to give a series of radiographs of matched density, and the incident X-radiation exposures were measured using a 3-inch (7.6-cm) pancake ion chamber (Model 2025, MDH Industries Inc.). The relative radiographic speeds were then calculated, taking the speed of the radiographic film exposed by the Control Panel A to be 100. The results are provided in the following TABLE IV.

TABLE IV

| Example | Intensifying Screen Support | Relative Speed |
| --- | --- | --- |
| Control Panel A | Black support: Support A | 100 |
| Example 1 | CM500: Support B | 110 |
| Example 2 | CM590: Support C | 111 |
| Example 3 | VM2000: Support D | 136 |

It is apparent from these data that the radiographic phosphor panels of the present invention provided a speed increase in the imaged radiographic films.

EXAMPLES 4–6

A white pigment containing support, Support E, was composed of poly(ethylene terephthalate) containing 5–7 weight % titania, providing a reflecting support similar to those commonly used in commercial radiographic phosphor panels. The reflectance of Support E at 545 nm to light incident normal to the reflector was ≠90%. Control Support A (black) and Invention Support D (VM2000 polymeric mirror) were also used.

A dispersion of terbium-doped gadolinium oxysulfide phosphor with a mean particle size of approximately 5 μm was prepared from 100 g of the phosphor in a solution prepared from 5 g of polyurethane binder (trademark PERMUTHANE U-6366) at 10 weight % in a 93:7 volume ratio of dichloromethane and methanol. The resulting dispersion was coated using a knife blade onto the supports that were held fast to an aluminum coating plate maintained at 10° C. The knife blade was adjusted to provide phosphor coverages of about 50 g/ft$^2$ (540 g/m$^2$), 30 g/ft$^2$ (324 g/m$^2$), and 10.5 g/ft$^2$ (113 g/m$^2$). The phosphor coverage was measured gravimetrically after the coatings had been thoroughly dried. For the sensitomeric (speed) evaluation, each panel was again placed in contact with a commercially available radiographic film (MinR2000, Eastman Kodak Co.) in a light-tight cassette (to provide an imaging assembly).

The imaging assemblies were used to image a "bone and beads" test object containing bone, plastic objects, steel wool, and miscellaneous objects having fine detail using a Philips CP80 high frequency x-ray generator operated at and 70 KVp, with 1.02 mm aluminum beam filtration and at a focal-film distance of 50 in. (127 cm). There were 2.375 inches (6 cm) of Lucite placed at the colimator during exposures to provide tube loading. Tube current (mA) was adjusted to give a series of radiographs of matched density, and the incident X-ray exposures were measured using a 3 inch pancake ion chamber (Model 2025, MDH Industries Inc.). The relative radiographic speeds were then calculated at each phosphor coverage level, taking the speed of the radiographic film exposed by the Control Panel A as 100. The sharpness of each imaging assembly was rated visually using the "bone and beads" test object radiographs. Ratings were grouped by coverage. As one would expect, the Control Panel having Support A gave superior resolution, but was significantly slower than panels on either of the reflective supports. The sharpness of the panels of the invention at each coverage was equal to that of the white comparison panel.

These examples demonstrated the superiority of the screens of the invention, taking both speed and sharpness into consideration. It is generally well appreciated in the art that speed and sharpness are parameters that can be "traded off". When an advantage is seen, taking both speed and sharpness into account, the advantage can be realized entirely as a speed advantage, entirely as a sharpness advantage, or as a combination of both. In this instance the speed advantage, with no difference in sharpness, demonstrated a significant improvement in the speed and sharpness relationship of the intensifying screens of this invention. This advantage can be realized entirely as a speed advantage or as a sharpness advantage or an advantage apparent both in terms of speed and sharpness. The results are provided below in TABLE V

TABLE V

| Example | Intensifying Screen Support | Phosphor Coverage | Relative Speed |
| --- | --- | --- | --- |
| Control Panel B | Black support: Support A | 50 | 100 |
| Control Panel C | White support: Support E | 50 | 122 |
| Example 4 | VM2000 support: Support D | 50 | 135 |
| Control Panel D | Black support: Support A | 30 | 100 |
| Control Panel E | White support: Support E | 30 | 126 |
| Example 5 | VM2000 support: Support D | 30 | 138 |
| Control Panel F | Black support: Support A | 10.5 | 100 |
| Control Panel G | White support: Support E | 10.5 | 190 |
| Example 6 | VM2000 support: Support D | 10.5 | 200 |

EXAMPLE 7

When used in low energy applications such as mammography, the X-radiation absorption of the panel support can be an important factor in the total exposure delivered to the patient. The X-radiation absorption of a typical white pigment-containing support, for example Support E described above, and Support D (VM2000 polymeric mirror) used in the practice of this invention was measured at 26 kVp using a Senographe DMR mammography unit (GE Medical). Incident and transmitted X-radiation fluxes were determined with an ion chamber designed for use at conventional mammographic energies (Model 20X5-6M, Radcal Corp). The results of the absorption measurements are shown in TABLE VI below and clearly show the reduced absorption advantage of the polymeric multi-layer reflectors used in the panels of this invention.

TABLE VI

| Example | Intensifying Screen Support | X-radiation Absorption |
| --- | --- | --- |
| Control Panel C | White support: Support E | 7% |
| Example 7 | VM2000 support: Support D | 1% |

The invention has been described in detail with particular reference to certain preferred embodiments thereof, but it will be understood that variations and modifications can be effected within the spirit and scope of the invention.

We claim:

1. A radiographic phosphor panel comprising a polymeric multi-layer reflector and a phosphor layer disposed on said polymeric multi-layer reflector, wherein said polymeric multi-layer reflector comprises alternating layers of polymer that have different indices of refraction.

2. The radiographic phosphor panel of claim 1 wherein said polymeric multi-layer reflector has a spectral reflectance of from about 40 to 100% in a bandwidth wavelength range greater than 10 nm.

3. The radiographic phosphor panel of claim 2 wherein said polymeric multi-layer reflector has a spectral reflectance of from about 60 to about 99% in a bandwidth wavelength range of greater than 10 nm.

4. The radiographic phosphor panel of claim 1 wherein said polymeric multi-layer reflector has a preferred spectral reflectance greater than 90% in a bandwidth wavelength range of from about 350 to about 750 nm.

5. The radiographic phosphor panel of claim 1 wherein said polymeric multi-layer reflector has a spectral reflectance greater than 90% in a wavelength range of greater than 10 nm.

6. The radiographic phosphor panel of claim 1 wherein said polymeric multi-layer reflector is substantially free of inorganic material.

7. The radiographic phosphor panel of claim 1 comprising a phosphor layer is directly disposed on said polymeric multi-layer reflector.

8. The radiographic phosphor panel of claim 1 wherein said polymeric multi-layer reflector is adhered to said phosphor layer with an adhesive.

9. The radiographic phosphor panel of claim 1 wherein said phosphor is an integral part of said polymeric multi-layer reflector.

10. The radiographic phosphor panel of claim 1 wherein said alternating polymer layers are isotropic.

11. The radiographic phosphor panel of claim 1 wherein said alternating polymer layers are birefringent.

12. The radiographic phosphor panel of claim 1 comprising at least two different polymers having different refractive indices.

13. The radiographic phosphor panel of claim 12 wherein said at least two different polymers having a difference in refractive index of at least 0.1.

14. The radiographic phosphor panel of claim 12 wherein said at least two different polymers alternate adjacent positions.

15. The radiographic phosphor panel of claim 12 wherein said at least two different polymers form an alternating repeating unit and said panel comprises a stack of at least 6 of said units.

16. The radiographic phosphor panel of claim 1 further comprising a supporting substrate.

17. The radiographic phosphor panel of claim 1 wherein said polymeric multi-layer reflector comprises a cholesteric film layer.

18. The panel of claim 17 wherein said cholesteric film layer comprises a multiple pitch cholesteric layer.

19. The panel of claim 1 wherein said polymeric multi-layer reflector is a wide angle polymeric multi-layer reflector comprises layers having a gradation in thickness from the topmost layer to the bottom most layer.

20. The panel of claim 19 comprises a phosphor layer directly adjacent the thinnest layer of said polymeric multi-layer reflector.

21. The panel of claim 1 wherein said polymeric multi-layer reflector is a narrow band polymeric multilayer reflector.

22. The panel of claim 1 wherein said polymeric multi-layer reflector comprises alternating layers of polymers wherein one of said alternating layers is comprised of a polymer selected from the group consisting of poly(ethylene 2,6-naphthalate) (PEN), poly(ethylene terephthalate) (PET), and copolymers thereof.

23. The panel of claim 1 wherein said polymeric multi-layer reflector comprises alternating layers of polymers wherein one of said alternating layers is comprised of a polymer selected from the group consisting of polymethylmethacrylate (PMMA), polyethyl methacrylate (PEMA), copolymers of PMMA (coPMMA), a blend of PMMA and poly(vinylidene fluoride) (PVDF), poly(ethylene-co-octene) (PE-PO), poly(propylene-co-ethylene) (PPPE), a copolymer of atactic polypropylene (aPP) and isotactic polypropylene (iPP), functionalized polyolefin, and linear low density polyethylene-g-maleic anhydride (LLDPE-g-MA).

24. The radiographic phosphor panel of claim 1 comprises a phosphor layer that is disposed on said polymeric multi-layer reflector and is comprised of fluorescent phosphor particles dispersed in a film forming binder, and further comprising a protective overcoat.

25. A radiographic phosphor panel according to claim 1 further characterized in that said phosphor layer is chosen so that the wavelength of the emitted radiation is within the 300 to 800 nm region of the electromagnetic spectrum.

26. The radiographic phosphor panel of claim 1 including a fluorescent layer comprised of a phosphor chosen from rare earth oxychalcogenide and halide phosphors of the formula:

$$M'_{(w-n)}M'_nO_wX'$$

wherein M' is at least one of the metals yttrium, lanthanum, gadolinium, or lutetium, M' is at least one of the rare earth metals dysprosium, erbium, europium, holmium, neodymium, praseodymium, samarium, tantalum, terbium, thulium or ytterbium, X' is a middle chalcogen or halogen, n is 0.0002 to 0.2, and w is 1 when X' is halogen or 2 when X' is a middle chalcogen.

27. The radiographic phosphor panel according to claim 26 wherein said phosphor is a terbium-activated gadolinium oxysulfide phosphor.

28. A radiographic imaging assembly comprising at least one radiographic phosphor panel comprising a polymeric multi-layer reflector and a phosphor layer disposed on said polymeric multi-layer reflector, wherein said polymeric multi-layer reflector comprises alternating layers of polymer that have different indices of refraction, and wherein said at least one radiographic phosphor panel being arranged in association with a photosensitive recording material.

29. The radiographic imaging assembly of claim 28 wherein said photosensitive recording material is a silver halide radiographic film.

30. Method of producing a radiographic phosphor panel comprising a supported layer of phosphor particles dispersed in a binder and a protective coating thereover wherein said binder consists essentially of one or more rubbery and/or elastomeric polymers and wherein said panel is prepared by dispersing phosphor particles in a binding medium consisting essentially of said one or more rubbery and/or elastomeric polymers, coating said dispersed phosphor particles so as to form a phosphor layer on a polymeric multi-layer reflector in a manner so as to form a phosphor layer without compressing the resulting dried phosphor layer and coating a protective coating thereover, wherein said polymeric multi-layer reflector comprises alternating layers of polymer that have different indices of refraction.

31. The method of claim 30, wherein said rubbery and/or elastomeric polymers are selected from the group consisting of thermoplastic elastomers and thermoplastic polyurethanes.

* * * * *